(12) United States Patent
Riley

(10) Patent No.: US 6,660,698 B2
(45) Date of Patent: *Dec. 9, 2003

(54) METHODS FOR EXTINGUISHING PETROLEUM-BASED FIRES, SUPPRESSING PETROLEUM-RELEASED VAPORS AND CLEANING PETROLEUM-CONTAMINATED SURFACES

(75) Inventor: Peter Riley, Paris (FR)

(73) Assignee: Hans Achtmann, New Canaan, CT (US)

( * ) Notice: Subject to any disclaimer, the term of this patent is extended or adjusted under 35 U.S.C. 154(b) by 46 days.

This patent is subject to a terminal disclaimer.

(21) Appl. No.: 09/987,234

(22) Filed: Oct. 29, 2001

(65) Prior Publication Data

US 2002/0096480 A1 Jul. 25, 2002

Related U.S. Application Data

(63) Continuation-in-part of application No. 09/458,678, filed on Dec. 10, 1999, now abandoned, which is a continuation-in-part of application No. 09/081,461, filed on May 19, 1998, now abandoned, which is a continuation of application No. 08/701,063, filed on Aug. 21, 1996, now Pat. No. 5,753,127.

(51) Int. Cl.$^7$ .......................... B01F 17/34; B01F 17/42; C02F 1/68; C11D 1/72; C11D 1/825
(52) U.S. Cl. ............................. 510/106; 252/2; 422/41; 210/749; 210/925; 510/188; 510/245; 510/356; 510/365; 510/366; 510/421; 510/422; 510/506; 516/74; 516/76
(58) Field of Search ................................. 210/749, 925; 516/74, 76; 510/188, 245, 356, 365, 366, 421, 422, 506, 160

(56) References Cited

U.S. PATENT DOCUMENTS

| | | | |
|---|---|---|---|
| 3,577,340 A | 5/1971 | Paviak et al. | 516/76 |
| 3,682,849 A | 8/1972 | Smith et al. | 510/506 X |
| 3,793,218 A | 2/1974 | Canevari | 516/63 |
| 3,959,134 A | 5/1976 | Canevari | 210/59 |
| 4,146,470 A | 3/1979 | Mohan et al. | 210/2 |
| 4,382,873 A | 5/1983 | Gatellier et al. | 516/74 X |
| 4,502,962 A | 3/1985 | Becker et al. | 210/749 |
| 4,560,482 A | 12/1985 | Canevari | 210/925 X |
| 4,597,893 A | 7/1986 | Byford et al. | 516/74 X |
| 4,830,759 A * | 5/1989 | Charlier | 516/74 X |
| 5,051,192 A | 9/1991 | Charlier | 210/749 |
| 5,618,468 A | 4/1997 | Canevari et al. | 516/74 X |
| 5,728,320 A * | 3/1998 | Fiocco et al. | 510/365 X |
| 5,753,127 A * | 5/1998 | Riley | 516/74 X |
| 6,194,473 B1 * | 2/2001 | Lessard et al. | 516/63 |

* cited by examiner

Primary Examiner—Richard D. Lovering
(74) Attorney, Agent, or Firm—Clark & Brody

(57) ABSTRACT

Compositions and methods for emulsifying a petroleum product that has been spilled upon a portion of the earth's surface or that is burning are based upon use of a nonionic, primary surfactant composition comprising a first ethoxylated sorbitol oleate and, preferably, a second ethoxylated sorbitol oleate, and a nonionic, secondary surfactant that is capable of stabilizing and solubilizing the primary surfactant composition such that the resulting emulsifying compositions have a hydrophilic/lipophilic balance between about 12.0 and about 13.5.

14 Claims, No Drawings

METHODS FOR EXTINGUISHING PETROLEUM-BASED FIRES, SUPPRESSING PETROLEUM-RELEASED VAPORS AND CLEANING PETROLEUM-CONTAMINATED SURFACES

This application is a continuation-in-part of commonly assigned U.S. patent application No. 09/458,678, filed Dec. 10, 1999 (now abandoned), which is a continuation-in-part of U.S. patent application No. 09/081,461, filed May 19, 1998 (now abandoned), which is in turn a continuation of U.S. patent application No. 08/701,063, filed Aug. 21, 1996, now U.S. Pat. No. 5,753,127.

BACKGROUND OF THE INVENTION

1. Field of the Invention

The present invention relates, in general, to compositions and methods for dispersing petroleum spills, and for accelerating biodegradation of such petroleum spills, and especially those that have occurred upon a body of water or any other surface.

2. Related Art

Crude petroleums, as well as many products derived from them, are shipped from oil-producing locations to oil-consuming locations in ocean-going vessels having huge capacities. Accidents in which the hulls of such vessels are breached and their contents spilled can cause serious damage to the environment. Unfortunately, such accidents are not at all uncommon. Land and offshore oil wells also can be a source of oil spills into ocean waters. Oil spills from such accidents may quickly spread over many square miles of water surface. When they occur near, or drift to, shorelines, such spills are particularly destructive toward local wildlife and plant life. Petroleum spills of this type also damage boats, fishing gear and harbor installations; and they greatly diminish the value of the shore as a recreational resource. If not treated, such spills require long periods to biodegrade; indeed, about 22 years is required to completely biodegrade one kilogram of crude oil by natural processes.

Other oil spills are the result of deliberate actions such as acts of war, sabotage, and illegal discharge of cleaning fluids that are employed to clean oil tankers in preparation for carrying a petroleum product that differs from the last product carried. Petroleum products flowing through refineries and oil transport pipe systems are often spilled on land as well. Such land spills likewise require very long periods; to biodegrade. Furthermore, since petroleum products are flammable, intense fires often occur as a result of such spills. Such fires are fed by vapors released by the petroleum products, such vapors including, e.g., ammonia and methane vapors. It is therefore highly advantageous to be able to contain and remove oil spills, and to arrest the vapors so that they may not enter and pollute the atmosphere, as soon as possible after the event.

Many methods have been used to remove oil spills from water and/or land. Such methods include physical removal of the petroleum from the water or land. chemical remediation of the spilled petroleum through the use of dispersants and so-called "sinking agents," and, in some cases, intentionally burning floating petroleum slicks. Chemical remediation through the use of liquid, oil dispersant agents is the most frequently employed clean-up method because such liquids can be readily applied to large oil spills and because this method is generally more cost-effective than physical remediation methods.

Most of the more effective methods of chemically remediating oil spills involve the use of various surfactant compositions. A surfactant is a surface-active agent whose molecules are composed of groups of opposing polarity and solubility, i.e., surfactants usually have both an oil-soluble hydrocarbon chain and a water-soluble group. Surfactants can be anionic, cationic, or nonionic. and they may be comprised of mixtures of any of these types of surfactants. Such surfactant mixtures often include other chemical agents, such as solvents, that enhance the dispersant capabilities of the surfactant. However, not all surfactant compositions are effective in dispersing spilled oil products-and many of the more effective ones have the drawbacks of being toxic and/or not biodegradable.

Oil spill dispersant compositions employing a wide variety of surfactants are found in the patent literature. For example, U.S. Pat. No. 4,597,893 to Byford et al. teaches a dispersant composition for treating oil on water. The composition comprises a nonionic surfactant, an anionic surfactant, a solvent, and water. The nonionic surfactant can be one or more polyalkoxylated (5 to 55 moles) sorbitol or sorbitan fatty acid esters containing 40 moles of ethylene oxide and having a hydrophilic/lipophilic balance (HLB) of 9 to 12. The nonionic surfactant comprises 8 to 58 weight percent of the overall composition. The anionic surfactant is preferably a salt of an alkyl aryl sulfonate. The solvent is a five- to ten-carbon primary alcohol, glycol, or glycol-ether, for example, ethylene glycol monoburyl ether. A water component also may be added as desired.

U.S. Pat. No. 3,793,218 to Canevari et al. teaches dispersal of oil slicks on water with a dispersant comprising a $C_{10}$ to $C_{12}$ aliphatic monocarboxylic acid or sorbitan monoester thereof, a sorbitan monoester polyoxyalkylene adduct, and a dialkyl sulfosuccinate salt. The dispersant can be applied to an oil slick with or without a solvent, such as, for example, paraffin (Isopar). The total hydrophilic/lipophilic balance of these compositions is between 9 and 11.5.

U.S. Pat. No. 4,382,873 to Gatellier et al. teaches a dispersant and biodegradant for oil that has been spilled on water. The dispersant contains (1) an assimilable nitrogen compound derived from melamine, (2) a hydroxy-providing compound such as a monoalcohol or a mono alkyl derivative of ethylene glycol, (3) an assimilable phosphorus derivative and (4) at least two of the following surface-active agents: sorbitan monolaurate, sorbitan trioleate, sorbitan monooleate, anhydrosorbitol monooleate, an ethoxylated primary alcohol ($C_{12}$–$C_{13}$), or PEG (300–400) mono- or di-oleate.

U.S. Pat. No. 3,959,134 to Canevari teaches an oil collection agent that surrounds and collects oil that has been spilled on water. The agent is a mixture of a $C_{10}$ to $C_{20}$ saturated or unsaturated fatty acid or the sorbitan monoester thereof (e.g., SPAN), and a nonpolar solvent such as isoparaffin.

U.S. Pat. No. 4,146,470 to Mohan et al. discloses a combination of microorganisms and surfactants to disperse and digest oil slicks. The microorganism is preferably *Micrococcus certificans*. The surfactant mixture contains 15% to 75% by weight of (1) sorbitan monooleate (SPAN 80) and polyoxyethylene sorbitan monooleate (TWEEN 80), or (2) an alkyl glycoside, or a mixture of (1) and (2). These surfactants may or may not be diluted in a paraffin solvent (Isopar). The HLB of the resulting composition is between 6.9 and 9.5.

There is, however, still a need for improved oil dispersant compositions. This need follows from the fact that many prior art dispersants; (1) are not always effective in dispersing highly viscous crude petroleum spills; (2) employ other components (in addition to nonionic surfactants), e.g., anionic surfactants, solvents, and dialkyl sulfosuccinate salts, that are not readily biodegradable, or contain compounds (e.g., certain anionic surfactants) that are themselves extremely toxic to the environment, and (3) cannot sustain a hydrophilic/lipophilic balance at a level that serves to increase their solubility with water. Others have unacceptably short shelf lives and, hence, must be mixed in the field, and few, if any, are also capable of serving as a fire-fighting agent as well as an oil dispersant.

3. Solution to the Problem

Several of the above-noted patents show that ethoxylated sorbitol oleates have been used in various dispersants used to treat oil spills; however, many ethoxylated sorbitol oleate-containing dispersants also have proven to be rather unstable and, hence, not well suited for long-term storage and are therefore of rather limited practical utility. Consequently, there have been many attempts to increase the stability of ethoxylated sorbitol oleate-containing oil emulsifying agents by adding other surfactant ingredients such as, for example, primary alcohols to them. However, primary alcohols alone have proved to be rather poor stabilizers for oil dispersants of this kind.

Applicant has, however, discovered that other types of surfactants having the hereinafter-described attributes can be added to certain ethoxylated sorbitol oleate-containing oil-emulsifying agents to form water-miscible compositions that are very effective at emulsifying spilled petroleum and/or petroleum products and are particularly characterized by their long shelf lives and by the fact that they employ only nonionic surfactants that are, in turn, characterized by their relatively low toxicity to the environment and by their relatively fast biodegradability. The emulsifying compositions of the present invention also are capable of remediating oil spills on land as well as on water.

Applicant's emulsifying compositions have other utilities as well. For example, they can be used as fire-fighting agents, and especially against class B (hydrocarbon) fires in addition to class A (natural fuels), class C (electrical), and class D (metals) fires. In particular, whether the target petroleum or petroleum-based product (e.g., oil or fuel) is spilled or burning, the composition of this invention bounds the petroleum into a fine emulsion. In the case of burning petroleum, the composition of this invention encapsulates the petroleum droplets to form an emulsion and prevents escape of vapors that feed the fire, e.g., ammonia and/or methane (which are released by the oil), thereby cutting off the source of and extinguishing the fire. When applied to a petroleum spill, the same emulsion extracts the petroleum from the ground or water surface and is of a nature that readily accelerates the natural biodegradation process of the petroleum while maintaining a very low level of aquatic toxicity. Moreover, the herein-described oil dispersant compositions can be used as cleaning agents in those situations where the surface to be cleaned has a high hydrocarbon concentration, e.g., airport runways and aprons, as well as various container walls, for example, those of rail cars, tanker trucks, sea-going tankers, storage tanks, and automobile fuel tanks. In still other applications, these compositions can be used to maintain and clean oil-contaminated machine tool parts and to maintain the track beds, switches, etc., of railway systems. Applicant's compositions may even be used to accelerate the rate of biodegradation in sewage systems. In addition, tests on live animals have shown that applicant's compositions are also exceptionally effective in the safe cleaning of oil-contaminated wildlife, such as birds, without any observable side effects. Further, applicant's compositions have been independently tested and found acceptable for use as cleaning agents in meat packing and poultry processing plants. As stated earlier herein, the composition of this invention can also be used to prevent the escape of (i.e., suppress) vapors released by petroleum or petroleum-based products, particularly spilled petroleum or petroleum-based products. Such vapors are typically ammonia and/or methane vapors. In addition, the compositions can be used to suppress ammonia and/or methane vapors released at sites containing materials undergoing biodegradation or decay, non-limiting examples of which include, e.g., sites containing petroleum and/or petroleum-based products or other material undergoing biodegradation or decay and releasing ammonia and/or methane vapors, compost (including decaying leaves) piles, animal waste sites, land fills containing petroleum or petroleum-based products or other material undergoing degradation or decay and releasing methane or ammonia vapors, and the like.

SUMMARY OF THE INVENTION

The present invention provides improved compositions and methods that are particularly effective for emulsifying and/or dispersing a petroleum product that has been spilled upon a portion of the earth's surface, e.g., upon a body of salt water, a body of fresh water, or a portion of land. The petroleum products that can be emulsified and dispersed by applicant's compositions can be crude petroleum, or petroleum-based products such as fuel oil, gasoline, jet fuel, and the like. Regardless of the exact nature of the petroleum product spill, applicant's compositions should be comprised of a nonionic, primary surfactant composition, a nonionic, secondary surfactant, and varying amounts of water depending upon the use to which these emulsifying and/or dispersing compositions will be applied.

Applicant's primary surfactant ingredient is an ethoxylated sorbitol oleate and more preferably is a composition comprised of a mixture of ethoxylated sorbitol oleates. That is to say that such ethoxylated sorbitol oleate mixtures will have a first ethoxylated sorbitol oleate and at least one other ethoxylated sorbitol oleate. In one particularly preferred mixture, the first ethoxylated sorbitol oleate is ethoxylated sorbitol septaoleate and the second ethoxylated sorbitol oleate is an ethoxylated sorbitol oleate selected from the group consisting of ethoxylated sorbitol trioleate and ethoxylated sorbitol hexaoleate. Most preferably, the nonionic, primary surfactant will comprise from about 45 to about 90 weight percent of the overall, end product, composition—as it is manufactured—but before it is diluted with water in the field-if indeed the end product composition is diluted in the field.

The secondary surfactant ingredient of the herein-described compositions for dispersing spilled petroleum products is most preferably a nonionic surficant, or mixture of nonionic surfactants—and especially those nonionic surfactants having a hydrophilic/lipophilic balance (HLB) of about 10 to about 17. Most preferably, the secondary surfactants of the herein-described compositions will be selected from the group consisting of linear ethoxylated secondary alcohols, polyoxyethylene aryl ether, ethoxylated fatty acid amides, ethoxylated fatty acids and ethoxylated sorbitan monolaurate. If they are so employed, such linear ethoxylated secondary alcohols preferably will contain from about 7 moles to about 11 moles of ethylene oxide and have an HLB of about 10 to about 15. If so employed, a polyoxyethylene aryl ether ingredient will most preferably have an HLB greater than 15.5. An ethoxylated sorbitan monolaurate ingredient will, preferably, contain from about 15 moles to about 26 moles of ethylene oxide and have an HLB of about 15 to about 17. Applicant's compositions preferably will contain from about 20 to about 36 weight percent (as such compositions are produced, but before they are further diluted, if they are in fact further diluted, prior to use in the field) of such a nonionic, secondary surfactant (or mixture of such surfactants). The secondary surfactant also should be capable of stabilizing and solubilizing the primary surfactant to an extent such that the resulting manufactured composition for emulsifying a petroleum product has an HLB from about 12.0 to about 13.5.

The water component of applicant's manufactured compositions may be inherently added to applicant's compositions as part of the manufacturing process by virtue of the fact that water may be a component of applicant's oleate ingredient(s) (e.g., about 25 to 35% thereof) and/or by virtue of the fact that water is added as a distinct ingredient in the manufacturing process. Preferably, the water in the oleate ingredients and/or secondary surfactant ingedient(s) and/or the water added as a distinct ingredient in a separate step in the manufacturing process will be in quantities such that the resulting emulsifying compositions, as they are manufactured, will comprise from about 0.05 to about 30 weight percent water. The water component of the manufactured compositions of this patent disclosure (i.e., before any addition of water to such manufactured compositions is carried out in the field) will preferably be less than about 30 weight percent of the manufactured product, and even more preferably will constitute less than 20 weight percent of such manufactured products. A separate water component used in the manufacturing process (ii any is in fact used) is preferably deionized water, but fresh water or even salt water may be employed for this purpose.

Certain optional components also may be added to the oil-emulsifying and/or dispersing compositions of this patent disclosure. These optional components preferably include an emulsion-stabilizing agent and/or a polyethylene glycol composition (and especially a polyethylene glycol having a molecular weight from about 200 to about 400). Such optional ingredient—containing oil-emulsifying composition, as manufactured, but before they undergo any dilution in the field, preferably will contain from about 1.0 weight percent to about 4.0 weight percent of such an emulsion-stabilizing, agent, and from about 1.0 weight percent to about 2.0 weight percent of such a polyethylene glycol ingredient. When any, or all, of these optional ingredients are employed, it is highly preferred that resulting compositions for emulsifying spilled petroleum, nonetheless, have the 12.0 to 13.5 HLB value sought in those compositions that do not contain any optional ingredients. It also should be noted that, regardless of whether or not these optional ingredients are employed, the end product compositions for emulsifying spilled petroleum products are also particularly characterized by their ready biodegradability, low levels of toxicity to the environment, wide range of thermal stability, ease of use (owing to the fact that they can be premixed long before use without undergoing intervening phase separation) and, if need be, their ability to fight fires as well as disperse oil.

To further enhance the rate of biodegradation of the emulsifying compositions of this patent disclosure in situations where the spill site is deficient in nitrogen, phosphorus and oxygen, small amounts of inorganic, commercially available fertilizers, such as mixtures of urea formaldehyde and potassium orthophosphates, also may be added to applicant's compositions as additional optional ingredients.

These optional fertilizer ingredients are preferably dissolved in water and added to applicant's manufactured products (again, before such products are diluted in the field) in concentrations such that no one of them forms more than about 0.5% of the total weight of the pre-field-diluted emulsifying compositions of this patent disclosure. If it is also desired to lower the freezing point of these emulsifying compositions, a nontoxic solvent such as, for example, diethylene glycol monobutyl ether also may be added as yet another optional ingredient. This ingredient, if used at all, will be added in concentrations such that the diethylene glycol monobutyl ether constitutes from about 1.0 to about 10.0 weight percent of the manufactured, end product composition.

In some of the most preferred compositions of this patent disclosure, prior to any field dilution, the ethoxylated sorbitol oleate ingredient will be a mixture of ethoxylated sorbitol oleates comprising (1) about 45 to about 50 weight percent of a first ethoxylated sorbitol oleate such as ethoxylated sorbitol septaoleate and wherein said ethoxylated sorbitol oleate contains from about 35 moles to about 45 moles of ethylene oxide; and (2) from about 9 to about 10 weight percent of a second ethoxylated sorbitol oleate, and especially those selected from the group of oleates consisting of ethoxylated sorbitol trioleate and ethoxylated sorbitol hexaoleate. Ethoxylated sorbitol trioleate and ethoxylated sorbitol hexaoleate ingredients containing about 40 moles to about 50 moles of ethylene oxide are particularly effective as second, or co-surfactant, ethoxylated sorbitol oleates. The remainder of these most preferred compositions will be comprised of from about 20 to about 36 weight percent of the secondary surficant and from about 0.05 to about 30.0 weight percent water.

The present invention also involves the use of certain hereinafter more fully described methods of contacting spilled petroleum with applicant's emulsifying compositions. To these ends, applicant's compositions may be added to a body of oil-polluted water, or land, in widely varying "loading" amounts and/or composition concentrations depending on the end result desired, the type of oil that has been spilled and/or the existing field conditions. It also should be noted that, for the purpose of this patent disclosure the terms "loading, " ", dosage, " etc., should be regarded as being synonymous.) Be that as it may, a "10% solution" of the herein-disclosed compositions may be thought of as a mixture that contains 10% by volume of the various surfactant ingredients (and optional ingredients, if any are used) that constitute the manufactured product and 90% by volume of locally added water. Such a 10% solution may, however, be even further diluted under certain circumstances. For example, some of the most preferred surfactant concentrations of applicant's compositions will be actually used in concentrations as low as about 3 volume percent of the overall manufactured composition (for example, such relatively low concentrations are effective when applied, with high shear, to spills of lighter petroleum products, such as jet fuel, gasoline and the like). On the other hand, solution concentrations of about 20 volume percent of the manufactured composition and 80 volume percent local water are particularly effective in dispersing somewhat heavier petroleum products (such as "light fuel oils") and lubricating oils, especially when only low shear can be applied. In general, spills of oils heavier than No. 4 lubricating oils, but lighter than No. 6 fuel oil, will call for use of oil-emulsifying manufactured compositions of this patent disclosure diluted to an extent such that a locally provided water component will comprise from about 80 to about 94 volume percent of the resulting mixture. Those compositions of this patent disclosure used to treat oil spills on land also will preferably be diluted to an extent that they comprise from about 80 to about 94 volume percent water, and those compositions of this patent disclosure that are applied in the context of an oil spill and fire also will most preferably comprise about 94 volume percent water and about 6 volume percent of applicant's compositions.

In general, spills of petroleum products less viscous than, say, No. 6 fuel oil and "bunker C" can be cleaned up using the manufactured compositions of this patent disclosure that have been diluted with water in the field. Such field dilution of the manufactured forms of the herein-described compositions is generally prescribed when the spilled oil is "lighter than" No. 6 fuel oil. For example, spills of petroleum products lighter than No. 6 fuel oil may be treated with applicant's compositions that have been diluted with water in the field to such an extent that the resulting manufactured composition/local water mixture that is applied to the spill will, most preferably, be comprised of from about 10 to about 90 volume percent of the locally provided water (that is to say, another 10 to 90 volume percent of local water will be added, regardless of the fact that a given manufactured composition may itself already be comprised of from about 0.05 to about 30 weight percent water).

Indeed, in the case of spills of very light petroleum products such as gasoline, jet fuel and the like, manufactured compositions/local water mixtures comprising up to 97 volume percent of local water (and hence, 3 volume percent of manufactured composition) may be employed, especially local agitation (e.g., provided by a ship's wake) also is available.

When the spilled petroleum product is a heavier petroleum product (e.g., crude petroleum and, generally speaking, a fuel oil as heavy as No. 6 fuel oil), a particularly preferred method of application is to apply a manufactured composition having no more than about 30 weight percent water (and more preferably a manufactured composition having no more than about 10 weight percent water) to the spilled oil. In other words, the manufactured composition is applied without any addition of water in the field just prior to use. Water may, however, be added to the resulting manufactured composition/spilled oil system after the manufactured composition is deployed upon the spilled oil.

Applicant has also found that the herein-described manufactured compositions (that is, those compositions existing prior to any field dilution with locally available water) can produce total emulsification with about one (1) part of undiluted composition per about five (5) pans of a spill of No. 6 oil or bunker C oil. Most heavy crude oils can be emulsified by one (1) part of undiluted composition to ten (10) parts of oil. In all cases, the application of the compositions of this patent disclosure and the resulting emulsions vastly reduce the tendency of oil slicks on water to adhere to rock surfaces.

In many cases an emulsifying effect may be all that is required and/or desired to disperse a given oil spill, but in most cases biodegradation of the emulsified oil/dispersant combination is the more desired end result. In any case, the compositions of the present invention are highly biodegradable in the context of such oil spill emulsifications. Applicant's tests have shown that most emulsified oil/dispersant systems produced by the herein-described compositions will biodegrade by about 80% within four (4) days of application of the herein-described compositions to an oil spill in water. Indeed, applicant has found that even within the first three (3) hours after application of applicant's compositions, about 10% biodegradation of the oil/dispersant system is obtained. In other tests, applicant found that up to about 97% biodegradation was obtained within 28 days after application. In yet another laboratory test, total elimination of the oil/dispersant combination was observed within 8 days after application of some of applicant's compositions to certain "light" petroleum products.

The present invention further provides methods of using the composition of this invention to: (i) extinguish fires occurring in petroleum or petroleum-based products, (ii) clean surfaces (including the body surfaces of wildlife, e.g., birds) contaminated with petroleum and/or petroleum-based product, (iii) accelerate biodegradation rate of petroleum or petroleum-based product, e.g., in a sewage system, and (iv) suppress production of methane and/or ammonia vapors by a petroleum or petroleum-based product or other material undergoing biodegradation or decay and releasing methane and/or ammonia vapors.

DETAILED DESCRIPTION OF THE INVENTION

1. Particularly Preferred Formulations Re: Certain Applications.

As previously stated, applicant has found that particularly good oil emulsification results are obtained when the secondary surfactant of the present invention stabilizes and solubilizes the primary surfactant composition to a degree such that the resulting, manufactured end product compositions (before any field dilution of such manufactured compositions takes place) have a hydrophilic/lipophilic balance (HLB) between about 12.0 and about 13.5. Those skilled in this art will appreciate that the term "HLB" as used herein is a well-known measure of the relative hydrophilicity or lipophilicity of a surfactant composition. Generally speaking, HLB values are obtained by dividing the molecular weight of the hydrophilic component of a compound by the molecular weight of the compound and multiplying the resulting number by selected adjuster values known to those skilled in this art. HLB values range on a scale from 1 to more than 20, with 1 indicating the least hydrophilic and 20 and above indicating the most hydrophilic.

Applicant has found that the stability of the dispersant/spilled oil emulsions produced by the compositions of this patent disclosure can be further increased when small amounts of an emulsion-stabilizing agent are included in applicant's compositions. These emulsion-stabilizing agents are often used to provide steric stabilization of dispersed particles (for example, literature published by Imperial Chemical Industries PLC (ICI) suggests use of their Hypermer A409® and Hypermer A394® compositions for this purpose). Applicant has, however, found that the inclusion of such emulsion-stabilizing agents in the herein-described compositions for dispersing, spilled petroleum products greatly increases the stability of the resulting petroleum/composition emulsion. This is an important finding because the increased longevity of the petroleum/composition emulsion enables the emulsion to be more completely biodegraded. Some of the better descriptions of such emulsion-stabilizing agents are found in the technical literature published by their manufacturers, and therefore, applicant hereby incorporates by reference the following publication describing the properties of ICI's Hypermer® Polymeric Surfactants and Dispersants for Industrial Applications", ICI Americas Inc., 1994. Regardless of the identity of their supplier, however, such emulsion-stabilizing agents may constitute from about 1.0 to about 4.0 weight percent of the overall manufactured compositions of this patent disclosure.

2. Particularly Preferred Methods of Formulating and Deploying Compositions.

To prepare the emulsifying compositions of the present invention, the Primary surfactant composition is preferably made by first combining the first and the second ethoxylated sorbitol oleates under light, nonaerating agitation. If desired, the emulsion-stabilizing agent and/or the polyethylene glycol are combined under moderately high shear conditions and then blended with the primary surfactant composition. In some of the more preferred embodiments of this invention, the secondary surfactant is added to the primary surfactant composition by blending it under nonaerating shear conditions. Finally, the water component, if desired, is preferably added by blending under low shear conditions. Again, it should be understood that additional water can be incorporated into the manufactured compositions of this patent disclosure at a later time, e.g., just prior to use, so that smaller volumes of the manufactured compositions of this parent disclosure may be transported to a spill site.

The emulsifying compositions of the present invention may be applied to petroleum spills on water or on land by conventional methods known to those skilled In the oil spill remediation arts, e.g., using various tank and spray nozzle devices, or example, applicant's emulsifying compositions may be sprayed directly on petroleum spills on water or on land with a small diameter hose equipped with a spray nozzle to supply a uniform spray. It also should be noted that it is not necessary to apply the compositions using a high-pressure hose. For large petroleum spills, applicant's compositions may be applied by using a helicopter equipped with tanks having a dump spout that can be operated from within the helicopter or such helicopters may be provided with tanks and a pipe manifold systems that are affixed to a plurality of spray nozzles.

For petroleum spills on land, dispension of the emulsifying compositions of this patent disclosure may be followed by physical agitation of the soil and then flushing with water. Alternatively, applicant's compositions also may be dispensed under pressure, for example, by a conventional fire extinguisher, whereby the pressure supplied by such a device mixes the emulsifying composition with the petroleum and simultaneously flushes it away.

Because of its emulsifying properties, the composition of this invention is useful in other applications as well, including, e.g., extinguishing fires occurring in petroleum or petroleum-based products, cleaning surfaces (including the body surfaces of wildlife, e.g., birds) contaminated with petroleum and/or petroleum-based product, accelerating biodegradation rate of petroleum or petroleum-based product (e.g., in a sewage system), and suppressing production of methane and/or ammonia vapors by a petroleum or petroleum-based product or other material undergoing biodegradation or decay.

Thus, one aspect of the present invention is directed to a method for extinguishing a fire occurring in a petroleum or petroleum-based product and caused by vapors released by the product, involving applying the composition of this invention to the fire and the product. As stated previously herein, the composition of this invention encapsulates the petroleum droplets to form an emulsion and prevents escape of vapors that feed the fire, e.g., ammonia and/or methane (which are released by the petroleum or petroleum-based product), thereby cutting off the source of and extinguishing the fire.

A further aspect of the present invention is directed to a method for cleaning a surface contaminated with petroleum and/or petroleum-based product, involving applying the composition of this invention to the surface. Non-limiting examples of suitable surfaces include those of airport runways, rail cars, tanker trucks, sea-going tankers, storage tanks, automobile fuel tanks, machine tool parts, track beds, railway system switches, and meat packing and poultry processing plants. The surface can also be the body surface of a wildlife member, e.g., birds.

Yet another aspect of the present invention is directed to a method for accelerating biodegradation rate of a petroleum or petroleum-based product, involving applying the composition of this invention to the product. In one embodiment of this method, the product is disposed in a sewage system.

A still further aspect of this invention is directed to a method for suppressing production of methane and/or ammonia vapors by a petroleum or petroleum-based product or other material undergoing biodegradation or decay and releasing ammonia and/or methane vapors, involving applying the composition of this invention to the product or material.

This invention is further illustrated by reference to the following tests conducted upon various formulations of the compositions of this patent disclosure with respect to their dispersion abilities, biodegradation, and toxicity.

3. Test Formulations.

Three emulsifying compositions were prepared having the following three formulations A, B, and C:

Emulsifier Formulation A 45 weight percent—Ethoxylated sorbitol septaoleate, containing 40 moles of ethylene oxide.

9 weight percent—Ethoxylated sorbitol trioleate, containing 40 to 50 moles of ethylene oxide.

36 weight percent—linear ethoxylated secondary alcohol, containing 7 to 11 moles of ethylene oxide and having an HLB of between 10 and 15, preferably 13.

10 weight percent—water.

Emulsifier Formulation B 50 weight percent—ethoxylated sorbitol septaoleate, containing 40 moles of ethylene oxide.

10 weight percent—ethoxylated sorbitol hexaoleate, containing 50 moles of ethylene oxide.

20 weight percent—polyoxylethylene aryl ether, having an HLB of greater than 15.5

20 weight percent—water.

Emulsifier Formulation C 45 weight percent—ethoxylated sorbitol septaoleate, containing 40 moles of ethylene oxide.

9 weight percent—ethoxylated sorbitol trioleate.

26 weight percent—ethoxylated sorbitan monolaurate.

20 weight percent—water.

a) Dispersion

Emulsifier formulation A was tested using a conventional low-energy swirling flask dispersant effectiveness test. This test is more fully described in 40 CFR Section 300 and said regulation is incorporated into this patent disclosure. The specific oil types used in applicant's test were two standard preference oils, that is, Prudhoe Bay Crude and South Louisiana Crude (a lighter oil than the Prudhoe Bay Crude).

The test was performed in "artificial sea water" (made from Instant Ocean®) made to a salinity of 35 parts per thousand. One part (by weight) of emulsifying formulation A was used to 10 parts (by weight) of oil. The test was done with three or four replicate samples. Results were measured as the UV-VIS spectrophometric absorbance at 340 nm. 370 nm. or 400 nm. The results of these tests are expressed below as the percentage of the oil remaining dispersed for 10 minutes after all agitation had ceased. Those skilled in this art will appreciate that in the oil remediation arts, a dispersion of 45% of the oil in such tests is regarded as being an acceptable test result. The results of applicant's tests are given in Table I and Table II.

TABLE I

% Dispersibility of Prudhoe Crude

|  | Replicate 1 | Replicate 2 | Replicate 3 |
| --- | --- | --- | --- |
| Absorbance at 340 nm | 45 | 54 | 47 |
| Absorbance at 370 nm | 44 | 53 | 46 |
| Absorbance at 400 nm | 43 | 53 | 45 |
| Average = SD | 44 = 1 | 53 = 1 | 46 = 1 |
| Overall average = SD |  | 48 = 4 |  |

TABLE II

% Dispersibility of South Louisiana Crude

|  | Replicate 1 | Replicate 2 | Replicate 3 | Replicate 4 |
| --- | --- | --- | --- | --- |
| Absorbance at 340 nm | 65 | 68 | 67 | 65 |
| Absorbance at 370 nm | 64 | 67 | 67 | 64 |
| Absorbance at 400 nm | 63 | 66 | 65 | 63 |
| Average = SD | 64 = 0.7 | 67 = 1.0 | 66 = 0.9 | 64 = 0.7 |
| Overall average = SD |  | 65 = 1.3 |  |  |

Tables I and II clearly show that emulsifying, formulation A disperses 48% of the Prudhoe Bay Crude and 65% of the South Louisiana Crude.

Applicant also conducted emulsifying and dispersing tests with emulsifying formulation A using concentrations as low as about 3% solutions with respect to "lighter" oil products such as No. 2 diesel oil, under moderately high shear conditions. However, applicant also found that if less agitation is available, somewhat higher concentrations, e.g., 15% solutions, were often required to emulsify and disperse a like amount of the No. 2 diesel oil. By way of contrast, in order to emulsify and disperse No. 6 fuel oil, a 100% solution of formulation A was applied at a ratio of one (1) part of composition to 10 parts of oil under moderate agitation to produce the desired emulsification effects.

b) Biodegradation The relatively quick and extensive biodegradation property of the oil-emulsifying compositions of this patent disclosure is one of their more important properties. It was tested using various tests known to the art including the E.M.P.A. test (the E.M.P.A. is a Swiss government organization charged with certifying oil-dispersant and emulsifying compositions). To this end, a standard test (EMPA SOP 720) was performed on emulsifying formulation A to determine the rate of biodegradation of this formulation in combination with an oil sludge over a period of 28 days. The amount of degradation was determined by measuring the percentage of the initial oxygen concentration. In such tests, applicant found that about 73% of a combination of emulsifying formulation A/oil sludge (at a concentration of 118 mg of formulation A per liter of oil sludge) was biodegraded by day 3 of the experiment, and about 81% was biodegraded by day 21. The further results of this test are shown in Table III.

TABLE III

| Day | % Initial Total Oxygen Concentration (TOC) |
| --- | --- |
| 0.1 | 10 |
| 1 | 30 |
| 3 | 73 |
| 7 | 75 |
| 14 | 79 |
| 21 | 81 |
| 28 | 81 |

Consequently, these test indicate that the values for the biodegradation of emulsifying formulation A in combination with oil sludge are well within the acceptable, range for certification of emulsifying formulation A by the E.M.P.A.

Applicant's own laboratory and field tests showed more than 81% degradation of a combination of oil and emulsifying formulation A was observed within four (41) days of application. In these tests, about 10% of the biodegradation occurred within the first three (3) hours after application of formulation A. In other tests, more than 97% of the oil/emulsifying formulation A combination was biodegraded after 28 days. Total elimination of the oil/formulation A combination in eight (8) days was observed in yet another laboratory test. The significance of these results can be better appreciated when one considers that natural lair biodegradation of one (1) kilogram of crude oil may take as long as 22 years.

c) Toxicity Another advantageous attribute of applicant's emulsifying/dispersant compositions is their low toxicity, especially toward aquatic life. In order to verify this low toxicity, a sample of formulation B (as described above) was tested for toxicity against two aquatic organisms, brine shrimp (Artemia sp.) and a species of fish (*Fundulus heteroclitus*). The test procedure involved exposing the organisms to increasing concentrations of emulsifying formulation B alone and to a combination of equal amounts of emulsifying formulation B and diesel oil and determining, the $LC_{50}$ (the concentration of formulation B alone or formulation B/oil combination that kills 50% of the organisms) after 8 hours of exposure for the shrimp and 96 hours of exposure for the fish. The $LC_{50}$ values for emulsifying formulation B alone were compared with $LC_{50}$ values for other dispersants of comparable efficiency as listed in the National Contingency Plan defined in 40 CFR Section 300. The results are shown in Table IV.

TABLE IV

| Dispersant | $LC_{50}$ (ppm after 96 hours) for Fundulus | $LC_{50}$ (ppm after 48 hours) for Artemia |
| --- | --- | --- |
| Emulsifying formulation B | 4900 | 2500 |
| D-9 | 115 | 630 |
| D-27 | 100 | 60 |
| D-61 | 180 | 60 |
| D-62 | 71 | 8 |
| D-64 | 109 | 155 |

The data in Table IV show that, for example, only 115 ppm (parts per million) of product D-9 will kill one-half of the fish in 96 hours, whereas 4900 ppm of applicant's emulsifying formulation B is required to kill one-half of the fish in the same period. For Artemia sp., the comparative dispersants kill one-half of the shrimp in 48 hours at concentrations of 8 to 630 ppm. Emulsifying formulation B, by contrast, had an $LC_{50}$ of 2500 ppm against Artemia sp. These tests indicate that emulsifying formulation B is less toxic than comparative dispersants by an order of magnitude.

When emulsifying formulation B was mixed with an equal amount of diesel oil and this diesel oil/emulsifier combination was tested for toxicity against organisms in the same way as described above, the $LC_{50}$ for Artemia sp. was 1500 ppm, and the $LC_{50}$ for Fundulus sp. was 1400 ppm. Again, these toxicity values are far lower than the $LC_{50}$ values shown in Table IV for comparative dispersants without oil.

The above disclosure sets forth a number of embodiments of the present invention. Those skilled in this art will however appreciate that other embodiments, not precisely set forth, also could be practiced under the teachings of the present invention and that the scope of this invention should only be limited by the scope of the following claims.

What is claimed is:

1. A method for cleaning a surface contaminated with petroleum and/or petroleum-based product, comprising applying to said surface a composition comprising:
   (a) a nonionic primary surfactant comprising an ethoxylated sorbitol oleate;
   (b) a nonionic secondary surfactant selected from the group consisting of linear ethoxylated secondary alcohols, polyoxyethylene aryl ethers, ethoxylated sorbitan monolaureates, ethoxylated fatty acid amides, and ethoxylated fatty acids and containing about 7 moles to about 26 moles of ethylene oxide and comprising from about 20 to about 36 weight percent of said composition, and wherein said nonionic secondary surfactant is capable of stabilizing and solubilizing said nonionic primary surfactant such that said composition has a hydrophilic/lipophilic balance between about 12.0 and about 13.5; and
   (c) water.

2. A method according to claim 1, wherein the primary surfactant is ethoxylated sorbitol septaoleate.

3. A method according to claim 1, wherein the secondary surfactant has a hydrophilic/lipophilic balance of from about 10 to about 17.

4. A method according to claim 1, wherein the composition further comprises an emulsion-stabilizing agent.

5. A method according to claim 1, wherein the composition further comprises a polyethylene glycol component having a molecular weight of from about 200 to about 400.

6. A method according to claim 1, wherein the surface is selected from the group consisting of airport runways, rail cars, tanker trucks, sea-going tankers, storage tanks, automobile fuel tanks, machine tool parts, track beds, railway system switches, and meat packing and poultry processing plants.

7. A method according to claim 1, wherein the surface is a body surface of a wildlife member.

8. A method according to claim 7, wherein the wildlife member is a bird.

9. A method for accelerating biodegradation rate of a petroleum or petroleum-based product, comprising applying to said product a composition comprising:
   (a) a nonionic primary surfactant comprising an ethoxylated sorbitol oleate;
   (b) a nonionic secondary surfactant selected from the group consisting of linear ethoxylated secondary alcohols, polyoxyethylene aryl ethers, ethoxylated sorbitan monolaureates, ethoxylated fatty acid amides, and ethoxylated fatty acids and containing about 7 moles to about 26 moles of ethylene oxide and comprising from about 20 to about 36 weight percent of said composition, and wherein said nonionic secondary surfactant is capable of stabilizing and solubilizing said nonionic primary surfactant such that said composition has a hydrophilic/lipophilic balance between about 12.0 and about 13.5; and
   (c) water.

10. A method according to claim 9, wherein said petroleum or petroleum-based product is disposed in a sewage system.

11. A method according to claim 9, wherein the primary surfactant is ethoxylated sorbitol septaoleate.

12. A method according to claim 9, wherein the secondary surfactant has a hydrophilic/lipophilic balance of from about 10 to about 17.

13. A method according to claim 9, wherein the composition further comprises an emulsion-stabilizing agent.

14. A method according to claim 9, wherein the composition further comprises a polyethylene glycol component having a molecular weight of from about 200 to about 400.

* * * * *